United States Patent
Wang

(10) Patent No.: US 9,004,892 B2
(45) Date of Patent: Apr. 14, 2015

(54) OPTICAL LENS MOLD WITH BUILT IN COOLING CHANNEL

(75) Inventor: Chien-Chun Wang, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 192 days.

(21) Appl. No.: 13/595,245

(22) Filed: Aug. 27, 2012

(65) Prior Publication Data

US 2013/0122129 A1      May 16, 2013

(30) Foreign Application Priority Data

Nov. 10, 2011    (TW) .............................. 100140990 A

(51) Int. Cl.
| | | |
|---|---|---|
| *B29C 45/73* | (2006.01) | |
| *B29C 45/78* | (2006.01) | |
| B29C 45/27 | (2006.01) | |
| B29L 11/00 | (2006.01) | |

(52) U.S. Cl.
CPC ... *B29C 45/7312* (2013.01); *B29C 2945/76531* (2013.01); *B29C 45/78* (2013.01); *B29C 2045/274* (2013.01); *B29L 2011/0016* (2013.01); *Y10S 425/808* (2013.01)

(58) Field of Classification Search
CPC ........ B29C 45/73; B29C 45/74; B29C 45/78; B29C 45/7312; B29C 45/2642; B29C 2045/274; B29C 2945/76531
USPC ............. 425/3, 143, 144, 160, 170, 526, 547, 425/548, 549, 407, 174.6, 808, DIG. 33, 425/DIG. 245, DIG. 246, 552; 264/327, 264/328.1, 328.14, 328.15, 328.8, DIG. 46; 249/79–80

See application file for complete search history.

(56) References Cited

U.S. PATENT DOCUMENTS

| | | | | | |
|---|---|---|---|---|---|
| 2,309,496 | A | * | 1/1943 | Bird et al. ..................... | 425/144 |
| 3,073,732 | A | * | 1/1963 | Heinz ........................... | 428/372 |
| 5,061,835 | A | * | 10/1991 | Iguchi .......................... | 219/630 |
| 5,360,329 | A | * | 11/1994 | Lemelson ................... | 425/143 |
| 5,483,043 | A | * | 1/1996 | Sturman et al. .............. | 219/647 |
| 6,033,198 | A | * | 3/2000 | Furlani et al. .................... | 425/3 |

(Continued)

FOREIGN PATENT DOCUMENTS

| | | | | | |
|---|---|---|---|---|---|
| FR | 2852881 | A1 * | 10/2004 | .............. | B29C 45/14 |
| JP | 62080015 | A * | 4/1987 | .............. | B29C 45/26 |

(Continued)

*Primary Examiner* — Dimple Bodawala
(74) *Attorney, Agent, or Firm* — Novak Druce Connolly Bove + Quigg LLP

(57) ABSTRACT

An optical lens mold includes a mold body, a magnetic fluid, a plurality of thermocouples, a plurality of electromagnets, a controlling unit and a power source. The mold body defines a plurality of injection chambers and a cooling channel surrounding the plurality of injection chambers. The magnetic fluid contains magnetic particles and flows in the cooling channel. The thermocouples are capable of sensing temperatures of the plurality of injection chambers correspondingly. The electromagnets are positioned above the cooling channel corresponding to the plurality of thermocouples. The plurality of thermocouples and the plurality of electromagnets are connected to the controlling unit via the power source, the controlling unit is capable of the comparing the standard temperature value with temperature values sensed by the plurality of thermocouples, and maintaining the temperature of the plurality of injection chambers in a normal state.

15 Claims, 1 Drawing Sheet

(56) References Cited

U.S. PATENT DOCUMENTS

| | | | |
|---|---|---|---|
| 6,203,731 B1* | 3/2001 | Kato et al. | 264/40.6 |
| 7,034,264 B2* | 4/2006 | Kagan | 219/661 |
| 7,679,036 B2* | 3/2010 | Feigenblum et al. | 219/635 |
| 8,162,640 B2* | 4/2012 | Chen et al. | 425/3 |
| 2004/0058027 A1* | 3/2004 | Guichard et al. | 425/174.6 |
| 2006/0144566 A1* | 7/2006 | Jensen et al. | 165/104.28 |
| 2007/0069426 A1* | 3/2007 | Kurita et al. | 264/428 |
| 2008/0260882 A1* | 10/2008 | Ortiz et al. | 425/3 |
| 2008/0303194 A1* | 12/2008 | Anbarasu et al. | 264/403 |
| 2011/0006460 A1* | 1/2011 | Vander Wel et al. | 264/403 |
| 2011/0241459 A1* | 10/2011 | Hashiba | 310/54 |
| 2012/0161367 A1* | 6/2012 | Kim et al. | 264/402 |
| 2013/0015178 A1* | 1/2013 | Lin | 219/660 |
| 2013/0189385 A1* | 7/2013 | Zoppas et al. | 425/3 |
| 2013/0299418 A1* | 11/2013 | Chamyvelumani et al. | 210/504 |

FOREIGN PATENT DOCUMENTS

| | | | | |
|---|---|---|---|---|
| JP | 03219936 A | * | 9/1991 | B29C 45/73 |
| JP | 05096576 A | * | 4/1993 | B29C 45/26 |

* cited by examiner

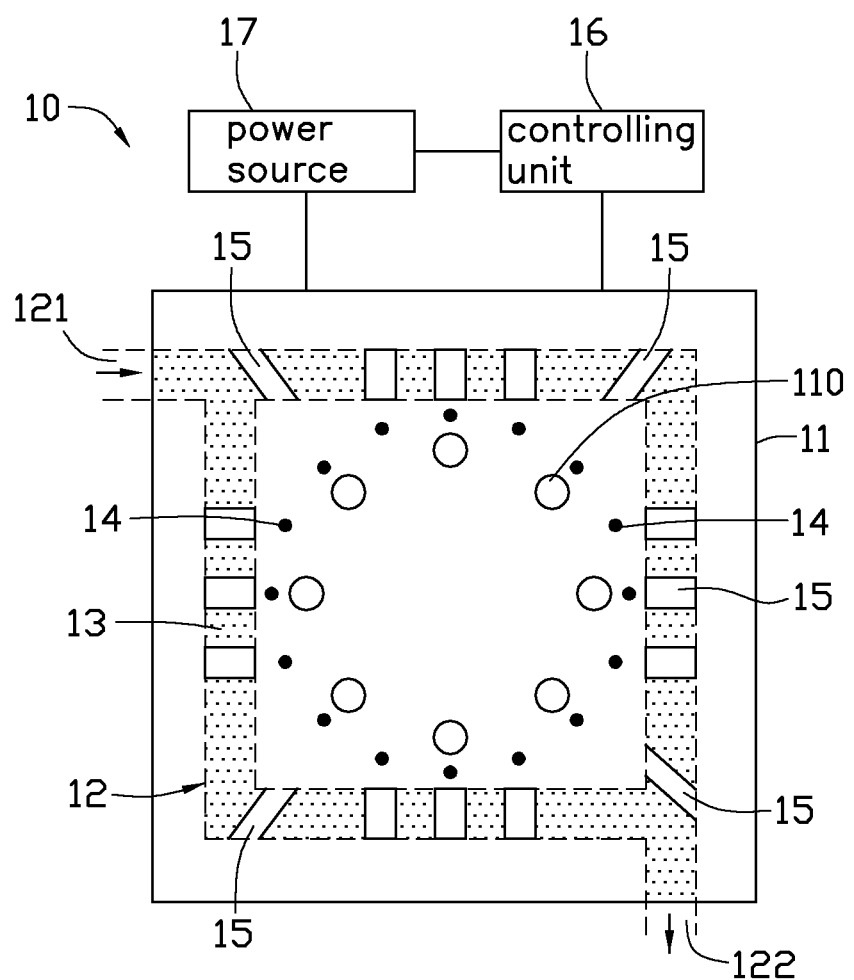

OPTICAL LENS MOLD WITH BUILT IN COOLING CHANNEL

BACKGROUND

1. Technical Field

The present disclosure relates to optical lens molds, and more particularly, to an optical lens mold with a built in cooling channel.

2. Description of Related Art

Optical lenses are fabricated by injection via an optical lens mold. The optical lens mold includes a mold body defining a plurality of injection chambers and a cooling channel surrounding the plurality of injection chambers. The structure of the cooling channel and precision of the optical lens mold have influence on a quality of the optical lens produced by the optical lens mold. Due to a materials limitation of the mold body, the cooling channel may be substantially in a "#" shape. The temperatures of the plurality of injection chambers are difficult to keep the same, as they may be changed due to the environment and the structure of the optical lens mold. Particularly, when producing high level optical lenses, several degrees of temperature difference may decrease the quality of the optical lens sharply.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

The FIGURE is a schematic view of an embodiment of an optical lens mold.

DETAILED DESCRIPTION

The FIGURE shows an embodiment of an optical lens mold 10. The optical lens mold 10 is for fabricating an optical lens. The optical lens mold 10 includes a mold body 11, a magnetic fluid 13, sixteen thermocouples 14, sixteen electromagnets 15, a controlling unit 16 and a power source 17. The mold body 11 defines a cooling channel 12 therein, the magnetic fluid 13 flows in the cooling channel 12.

The mold body 11 further defines eight injection chambers 110 to receive core molds (not shown). Each injection chamber 110 is in a circle shape and the eight injection chambers 110 are arranged in a loop adjacent to an inner periphery of the mold body 11. The number of the injection chambers 110 is arbitrary, such as one, two or three. The mold body 11 is made of metallic material with a higher heat conductively, such as copper, alumina, ferrum, nickel, titanium, steel, titanium steel, stainless steel.

The cooling channel 12 surrounds a periphery of all the injection chambers 110, and defines an inlet 121 and an outlet 122 at opposite ends. In the illustrated embodiment, a middle portion of the cooling channel 12 is substantially in a rectangular shape. In other words, the cooling channel 12 is substantially in a square shape and surrounds all the injection chambers 110. Also, the cooling channel 12 may be a circle shape, the shape of the cooling channel 12 may be changed according to an acquirement of the optical lens mold 10. The number and position of the inlet 121 and the outlet 122 can be changed according to an acquirement of the optical lens mold 10.

The magnetic fluid 13 flows into the cooling channel 12 via the inlet 121 and outflows the cooling channel 12 via the outlet 122. The magnetic fluid 13 effused from the outlet 122 is capable of flowing into the cooling channel 12 again, thus forms a recycle circulation.

The magnetic fluid 13 may be selected from a group of consisting of oil, water, ammonia liquor, methanol, acetone and heptanes mingled with magnetic particles such as a group consisting of magnetite particles, hematite particles and mixed magnetic particles. As heat conductivity ratio of the magnetic fluid 13 is greater than that of oil and water, such that the heat conductively capability of the magnetic fluid 13 is superior to oil and water.

The sixteen thermocouples 14 are arranged along an inner periphery of the mold body 11. The sixteen thermocouples 14 uniformly surround the eight injection chambers 110 and infinitely approach the eight injection chambers 110 correspondingly as long as the thermocouples 14 have no interference with the core molds received in the injection chambers 110. The thermocouple 14 is capable of sensing the temperature of the injection chamber 110 correspondingly. Each injection chamber 110 is surrounded by three thermocouples 14. The sixteen thermocouples 14 are electrically connected to the controlling unit 16 for sending a temperature value sensed thereby to the controlling unit 16.

The sixteen electromagnets 15 are separately positioned on the mold body 11 above the cooling channel 12 and adjacent to the sixteen thermocouples 14 correspondingly. The sixteen electromagnets 15 are electrically connected to the power source 17, respectively.

The controlling unit 16 pre-stores a predetermined temperature value, the predetermined temperature value is equal to the temperature of the core mold as long as the temperature has no negative influence to the producing process of the optical lens. The controlling unit 16 may be a micro-processor or a computer.

When in work, each thermocouple 14 senses and measures the temperature value of the injection chamber 110, and sends it to the controlling unit 16. The controlling unit 16 compares the temperature value of the injection chamber 110 with the predetermined temperature value to produce a temperature deviation. The controlling unit 16 is capable of controlling the power source 17 to supply a current to the electromagnet 15 according to the temperature deviation, details is illustrated as follows.

Sample one: when temperature values sensed by one or several thermocouples 14 are higher than the predetermined temperature value, the controlling unit 16 controls the power source 17 to supply a relatively lower current to the corresponding electromagnets 15, and supply no current to the other electromagnets 15. So the magnetic particles are gathered by a magnetic field produced by the electromagnets 15. Due to Fourier's law $Q=-kA(dT/dx)$ (Q is caloric value, k is thermal conductivity, A is heat transfer area, dT/dx is temperature grade), heat conductivity of magnetic particles of high density area is greater, such that heat around the electromagnet 15 is scattered quickly. The temperature of the corresponding injection chamber 110 decreases quickly.

Sample two: when temperature values sensed by one or several thermocouples 14 are lower than the predetermined temperature value, the controlling unit 16 controls the power source 17 to supply a relatively higher and quick break current to the corresponding electromagnets 15, and supply no current to the other electromagnets 15. Heat can be generated by the current on electromagnets 15 and the temperature of the corresponding thermocouple 14 increases quickly. As the time of the current supplied to the electromagnets 15 is shot, and heat dissipating of the magnetic particles exists, so the temperature of corresponding injection chamber 110 can remain on a normal state.

Sample three: when temperature values sensed by one or several thermocouples 14 are higher than the predetermined temperature value, and temperature values sensed by other one or several thermocouples 14 are lower than the predetermined temperature value, the controlling unit 16 controls the power source 17 to supply a relatively lower current to the electromagnets 15 corresponding to the thermocouples 14 with a higher temperature value, and supply a higher and quick break current to the electromagnets 15 corresponding to the thermocouples 14 with a lower temperature value. Then the effective zone of the injection chambers 110 stays in the predetermined temperature environment.

The optical lens mold 10 is capable of supervising the temperature of the injection chambers 110 via the thermocouples 14, and controls the temperature of the injection chambers 110 via supplying power to the corresponding electromagnets 15, such that a quick and real-time temperature controlling is achieved.

The number of the thermocouples 14 can be changed according to the number of the injection chambers 110, the number of the electromagnets 15 can be changed if needed.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An optical lens mold, comprising:
   a mold body defining a plurality of injection chambers therein and a cooling channel surrounding the plurality of injection chambers;
   a magnetic fluid containing magnetic particles and flowing in the cooling channel;
   a plurality of thermocouples capable of sensing temperatures of the plurality of injection chambers correspondingly;
   a plurality of electromagnets positioned on the mold body above the cooling channel and corresponding to the plurality of thermocouples;
   a controlling unit having a predetermined temperature value; and
   a power source connected to the plurality of electromagnets, wherein the controlling unit is connected to the plurality of thermocouples and the power source, the controlling unit is capable of comparing the predetermined temperature value with temperature values sensed by the plurality of thermocouples to produce temperature deviations, and controlling the power source to supply current to the electromagnets according to the temperature deviations.

2. The optical lens mold of claim 1, wherein each injection chamber is in a circle shape and the plurality of injection chambers are arranged in a loop adjacent to an inner periphery of the mold body to receive a plurality of core molds correspondingly.

3. The optical lens mold of claim 2, wherein the cooling channel surrounds a periphery of all the injection chambers, and defines an inlet and an outlet at opposite ends, the magnetic fluid flows into the cooling channel via the inlet and outflows the cooling channel via the outlet, the magnetic fluid effused from the outlet is capable of flowing into the cooling channel again, thus forms a recycle circulation.

4. The optical lens mold of claim 3, wherein a middle portion of the cooling channel is substantially rectangular.

5. The optical lens mold of claim 1, wherein the magnetic fluid is selected from the group consisting of oil, water, ammonia liquor, methanol, acetone and heptanes mingled with magnetic particles.

6. The optical lens mold of claim 5, wherein the magnetite particles are selected from the group consisting of magnetite particles, hematite particles and mixed magnetic particles.

7. The optical lens mold of claim 2, wherein the plurality of thermocouples are arranged along an inner periphery of the mold body and uniformly surround the injection chambers, and infinitely approach the injection chambers as long as the thermocouples have no interference with the core molds received in the injection chambers.

8. The optical lens mold of claim 7, wherein the plurality of electromagnets are adjacent to the plurality of thermocouples correspondingly.

9. An optical lens mold, comprising:
   a power source;
   a mold body defining a plurality of injection chambers therein and a cooling channel to cool the plurality of injection chambers;
   a magnetic fluid containing magnetic particles therein and flowing in the cooling channel;
   a plurality of thermocouples mounted adjacent to the plurality of injection chambers correspondingly;
   a plurality of electromagnets mounted above the cooling channel and adjacent to the plurality of thermocouples correspondingly, the plurality of electromagnets being connected to the power source; and
   a controlling unit having a predetermined temperature value; wherein the controlling unit is electronically connected to the plurality of thermocouples and the power source, the controlling unit is capable of comparing the predetermined temperature value with temperature values sensed by the plurality of thermocouples, and controlling the power source to supply current to corresponding electromagnets to generate heat or supply lower current to gather the magnetic particles in the magnetic fluid to dissipate heat.

10. The optical lens mold of claim 9, wherein each injection chamber is in a circle shape and the plurality of injection chambers are arranged in a loop adjacent to an inner periphery of the mold body to receive a plurality of core molds correspondingly.

11. The optical lens mold of claim 10, wherein the cooling channel surrounds a periphery of all the injection chambers, and defines an inlet and an outlet at opposite ends, the magnetic fluid flows into the cooling channel via the inlet and outflows the cooling channel via the outlet, the magnetic fluid effused from the outlet is capable of flowing into the cooling channel again, thus forms a recycle circulation.

12. The optical lens mold of claim 11, wherein a middle portion of the cooling channel is substantially in a rectangular shape.

13. The optical lens mold of claim 9, wherein the magnetic fluid is selected from the group consisting of oil, water, ammonia liquor, methanol, acetone and heptanes mingled with magnetic particles.

14. The optical lens mold of claim 13, wherein the magnetite particles are selected from the group consisting of magnetite particles, hematite particles and mixed magnetic particles.

15. The optical lens mold of claim 10, wherein the plurality of thermocouples are arranged along an inner periphery of the mold body and uniformly surround the injection chambers, and infinitely approach the injection chambers as long as the thermocouples have no interference with the core molds received in the injection chambers.

* * * * *